United States Patent [19]

Suh et al.

[11] Patent Number: 5,830,924
[45] Date of Patent: Nov. 3, 1998

[54] NON-LINEAR STYRENIC POLYMER-BASED FOAMS

[75] Inventors: Kyung Suh, Granville, Ohio; Mehmet Demirörs, Terneuzen, Netherlands; Chau V. Vo, Souffelweyersheim, France

[73] Assignee: The Dow Chemical Company, Midland, Mich.

[21] Appl. No.: 817,078

[22] PCT Filed: Oct. 13, 1995

[86] PCT No.: PCT/US95/13362

§ 371 Date: Apr. 9, 1997

§ 102(e) Date: Apr. 9, 1997

[87] PCT Pub. No.: WO96/11970

PCT Pub. Date: Apr. 25, 1996

[30] Foreign Application Priority Data

Oct. 13, 1994 [GB] United Kingdom .................. 9420644

[51] Int. Cl.⁶ .................. C08J 9/08; C08J 9/14
[52] U.S. Cl. .............. 521/79; 521/81; 521/146; 521/148
[58] Field of Search .............. 521/79, 81, 146, 521/148

[56] References Cited

U.S. PATENT DOCUMENTS

| | | | |
|---|---|---|---|
| Re. 34,123 | 11/1992 | Francis et al. | 264/50 |
| 2,593,399 | 4/1952 | Park | 260/93.5 |
| 3,260,748 | 7/1966 | Nelson, Jr. et al. | 260/564 |
| 4,376,847 | 3/1983 | Matsubara et al. | 525/262 |
| 5,182,308 | 1/1993 | Voelker et al. | 521/79 |
| 5,185,405 | 2/1993 | Nishida | 525/228 |
| 5,191,040 | 3/1993 | Okumura et al. | 526/65 |
| 5,334,646 | 8/1994 | Chen | 521/148 |
| 5,387,617 | 2/1995 | Hedstrand et al. | 521/146 |
| 5,393,795 | 2/1995 | Hedstrand et al. | 521/146 |
| 5,393,797 | 2/1995 | Hedstrand et al. | 521/146 |
| 5,508,334 | 4/1996 | Chen | 521/148 |
| 5,576,094 | 11/1996 | Callens et al. | 521/146 |
| 5,585,411 | 12/1996 | Hwo | 521/140 |

FOREIGN PATENT DOCUMENTS

| | | | |
|---|---|---|---|
| 4309057 | 9/1994 | Germany | C08F 12/00 |
| 58/126853 | 7/1983 | Japan | C07C 179/06 |
| 1555725 | 11/1979 | United Kingdom | C08F 279/04 |

*Primary Examiner*—Morton Foelak

[57] ABSTRACT

Disclosed is a process for preparing a low density closed-cell polymer foam comprising a plurality of closed-cells having an average cell size of at least about 0.08 millimeter characterized in that the process comprises the steps of heat plastifying an expandable or foamable monovinyl aromatic polymer formulation comprising a non-linear monovinyl aromatic polymer composition and an environmentally acceptable blowing agent; and reducing the pressure on the mixture to form a foam. A stable monovinyl aromatic polymer foam prepared from a non-linear styrenic polymer composition and environmentally acceptable blowing agents is also disclosed.

15 Claims, No Drawings

NON-LINEAR STYRENIC POLYMER-BASED FOAMS

The present invention relates to monovinyl aromatic polymer foams. More particularly, this invention relates to non-linear monovinyl aromatic polymer-based foams.

Monovinyl aromatic-based resins, such as, for example, styrene-based resins, are well-known and widely employed in transformation processes into molded and/or extruded articles. In these processes, styrene-based resins having lower melt flow rate (such as from 0.5 g/10 minutes to 5 g/10 minutes) are usually preferred. The physical properties of such monovinyl aromatic polymers, also known as styrenic polymers, generally improve as the molecular weight increases. The processability of such monovinyl aromatic polymers, however, generally decreases as the molecular weight increases. Accordingly, the choice of a monovinyl aromatic polymer having sufficient properties usually involves a compromise between physical property requirements and processing requirements.

One approach to improve the processability of monovinyl aromatic polymers has been the addition of processing aids, such as plasticizers. It is known that the addition of plasticizers to polymer resins reduces the viscosity and increases the processability while decreasing the physical strength thereof. A problem frequently encountered with the use of such plasticizers is that they also reduce certain properties of such polymers.

Another approach has been the use of specific copolymerizable monomers in the polymerization process. Suitable copolymerizable monomers include polyfunctional monomers such di-, tri- or tetrafunctional monomers, such as, for example divinylbenzene, di(meth)acrylates, tri(meth)acrylates, and allylic compounds copolymerizable with the monovinyl aromatic monomer(s).

It also is common practice to improve the physical properties of styrenic polymers by modifying the styrenic polymer matrix with toughening agents such as rubbers. However, the addition of toughening agents is known to affect the processability of styrenic polymers adversely.

Japanese Patent Application 61-87713 describes a process of producing randomly branched styrenic polymers having molecular weights above 540,000 and improved physical properties, such as mechanical strength, as well as good processability. The styrenic polymers described contain a substantial level of residual toluene (approximately 6 percent). It is believed that this styrenic polymer has a high melt flow rate due to the presence of volatile components. Likewise, adverse effects on the Vicat heat distortion temperature and melt strength properties of this polymer would be expected. The process comprises the use of one or more organic peroxides, such as alkylperoxy-alkylfumarates.

Styrenic polymers are known to be useful in a large variety of applications. For example, thermoplastic foams such as styrene polymer foams which are widely used in the fields of construction, civil engineering and thermal insulation. The styrene polymer foam suitable for such applications desirably has relatively small cells and dimensional stability. These foams are the so-called extruded foams. Extruded foams are also employed in the so-called decorative field wherein a foam plank may be cut into a decorative foam and be used as is or used as a base for further decorative material.

Extruded foams and their manufacture are discussed in U.S. Pat. Nos. 2,409,910; 2,515,250; 2,669,751; 2,848,428; 2,928,130; 3,121,130; 3,121,911; 3,770,688; 3,815,674; 3,960,792; 3,966,381; 4,085,073; 4,146,563; 4,229,396; 4,312,910; 4,421,866; 4,438,224; 4,454,086 and 4,486,550. For a considerable period of time, styrene polymer foams have been extruded employing a variety of organic blowing agents, such as chlorofluorocarbons (CFC's), hydrochlorofluorocarbons (HCFC's), and other fully halogenated hydrocarbons as well as mixtures thereof. An alternative blowing agent system utilizing carbon dioxide and an alkane is set forth in U.S. Pat. Nos. 4,344,710 and 4,424,287.

Due to increased environmental concerns about ozone depletion, greenhouse effects and air quality in general, large efforts are being made to replace CFC's and other fully halogenated hydrocarbons currently used as blowing agents in the foam industry with environmentally more acceptable blowing agents.

Further, it would be highly desirable to provide a process for preparing a low density aromatic polymer foam from a non-linear monovinyl aromatic polymer using an environmentally more acceptable blowing agent.

In one aspect, the present invention is a process for preparing a low density closed-cell polymer foam comprising a plurality of closed cells having an average cell size of at least about 0.08 millimeter (mm), the process comprising the steps of heat plastifying an expandable or foamable non-linear monovinyl aromatic polymer composition useful in this invention and an environmentally acceptable blowing agent; and reducing the pressure on the mixture to form a foam. Advantageously, the foam of the invention can be produced using only $CO_2$ as a blowing agent.

Yet in another aspect, the present invention is a stable monovinyl aromatic polymer foam having a plurality of closed cells having an average cell size of at least about 0.08 mm and containing an environmentally acceptable blowing agent prepared by extruding the non-linear monovinyl aromatic polymer composition of the present invention using environmentally acceptable blowing agents.

For purposes of the present invention, environmentally more acceptable blowing agents is meant to include inorganic blowing agents, such as $CO_2$, alone or in combination with other blowing agents, such as lower alcohols, ethers, HCFC's or HFC's.

Particularly surprising advantages of using the non-linear styrenic polymer composition useful in the present invention in a process to prepare foam include: reduced pressure drop across the extrusion line; lower foam density by increasing the blowing agent efficiency; and maintenance of good mechanical and heat resistance properties of the foam. In addition, such compositions are especially advantageous in that they permit the preparation of such articles using blowing agent mixture(s) that are less stable and have a shorter half-life than those chlorofluorocarbons previously used without excessive shrinkage during the manufacture thereof and/or during the storage thereof in fresh foam. That is, the resulting foamed articles have (in fresh foam form) relatively good dimensional stability at ambient temperatures (for example, 21° C. (70° F.)); typically shrinking to no less than about 80 (preferably no less than about 90) percent of their initial foamed volume under such manufacturing and/or storage condition.

The non-linear polymers of the present invention have a molecular weight of from 75,000 to 500,000 and are derived from at least 50 weight percent of a monovinyl aromatic monomer, optionally with one or more additional comonomers. They comprise a polymer matrix of at least one monovinyl aromatic monomer and, optionally, one or more additional comonomers. The term "non-linear polymer" as used herein means a polymer containing monomer units having at least 1 and up to 4 branching points. The weight average molecular weight of branches emanating from the said branching points will generally be at least 1,000, preferably 5,000 or higher. The structure of such non-linear polymers can be a comb-type form wherein the said monomer units have 3 branching points, a star-type form wherein the said monomer units have from 2 to 4 branching points, or a dendritic structure wherein the branches themselves have branched units attached to them as long as there are no more than 4 branches per monomeric unit.

The higher temperature of polymerization, at least after the initial polymerization phase, of the polymers of the present invention, as compared with those of the Japanese reference referred to above results in branching chain length somewhat lower than in the said reference (i.e., lower than 300,000) which is believed to result in the improved melt strength of the polymers of the invention.

Representative monovinyl aromatic monomers include styrene; alkyl-substituted styrenes such as α-alkylstyrenes (for example, α-methylstyrene and α-ethylstyrene); ring-substituted styrenes (for example, 2,4-dimethyl-styrene; o-ethylstyrene, t-butylstyrene, vinyltoluene and particularly p-vinyltoluene; ring-substituted halostyrenes such as chlorostyrene and 2,4-dichlorostyrene; styrene substituted with both a halo and alkyl group, such as 2-chloro-4-methylstyrene; vinyl anthracene; and mixtures thereof. In general, the polymer matrix is preferably derived from styrene or a combination of styrene and α-methylstyrene. Styrene is the most preferred monovinyl aromatic monomer.

In general, the non-linear monovinyl aromatic polymer will advantageously comprise from 50 to 100, preferably from 65 to 100, more preferably from 75 to 100, weight percent of the monovinyl aromatic monomer(s), based on the total weight of the monomers.

Other comonomers can optionally be employed in combination with the monovinyl aromatic monomer(s). Representative of such other comonomers are the polyvinyl aromatic monomers; the conjugated dienes such as butadiene and isoprene; the α,β-ethylenically unsaturated carboxylic acids and $C_1$–$C_8$ esters, preferably $C_1$–$C_4$ esters, thereof such as acrylic acid, methacrylic acid, methylacrylate, methyl methacrylate, ethylacrylate, ethylmethacrylate, n-butylacrylate, n-butylmethacrylate and 2-ethylhexylacrylate; the ethylenically unsaturated amides such as acrylamide and methacrylamide; vinylidene chloride and vinylidene bromide; vinyl esters such as vinyl acetate; and maleimides such as N-phenyl maleimide. If employed, these comonomers will generally be employed in amounts less than 40, more generally less than 35, weight percent based on the total weight of the monomers employed in preparing the non-linear monovinyl aromatic polymer.

The non-linear character of the polymers of the present invention is introduced by the use of one or more specific initiators in the polymerization process. Suitable initiators include copolymerizable organic peroxide initiators. Representative copolymerizable organic peroxide initiators useful in the present invention include acrylic acid derivatives containing a peroxide unit, such as a percarbonate, perester, perketal, or a hydroperoxide. The copolymerizable functionality could be derived from any vinylic species that is capable of copolymerization with the monovinyl aromatic monomer employed.

Representative copolymerizable organic peroxide initiators include alkylperoxy-alkylfumarates, such as, for example, t-butylperoxy-methylfumarate, t-butylperoxy-ethylfumarate, t-butylperoxy-n-propylfumarate, t-butylperoxy-isopropylfumarate, t-butylperoxy-n-butylfumarate, t-butylperoxy-t-butylfumarate, t-butylperoxy-sec-butylfumarate, t-butylperoxy-n-hexylfumarate, t-butylperoxy-n-octylfumarate, t-butylperoxy-2-ethylhexylfumarate, t-butylperoxy-phenylfumarate, t-butylperoxy-m-toluylfumarate, t-butylperoxy-cyclohexylfumarate, t-amylperoxy-n-propylfumarate, t-amylperoxy-isopropylfumarate, t-amylperoxy-n-butylfumarate, t-amylperoxy-t-butylfumarate, t-amylperoxy-n-octylfumarate, t-amylperoxy-2-ethylhexylfumarate, t-hexylperoxy-ethylfumarate, t-hexyl-peroxy-n-propylfumarate, t-hexylperoxy-isopropylfumarate, t-hexyl peroxy-n-butylfumarate, t-hexylperoxy-t-butylfumarate, t-hexylperoxy-cyclohexylfumarate, t-hexylperoxy-2-ethylhexylfumarate, t-hexylperoxy-phenylfumarate, cumylperoxy-ethylfumarate, cumylperoxy-isopropylfumarate, cumylperoxy-n-butylfumarate, cumylperoxy-t-butylfumarate, cumylperoxy-2-ethylhexylfumarate, cumylperoxy-m-toluylfumarate, and cumylperoxy-cyclohexylfumarate. Preferred initiators are t-butylperoxy-isopropylfumarate, t-butylperoxy-n-butylfumarate, t-butylperoxy-sec-butylfumarate, t-butylperoxy-t-butylfumarate, t-butylperoxy-ethylfumarate, t-butylperoxy-n-hexylfumarate, t-butylperoxy-phenylfumarate, with t-butylperoxy-n-butylfumarate and t-butylperoxy-t-butylfumarate being especially preferred.

The copolymerizable organic peroxide initiators are typically employed in amounts of from 0.001 to 2.0, preferably from 0.001 to 0.5, most preferably from 0.002 to 0.3, weight percent, based on the total weight of the monomers.

The monovinyl aromatic polymer compositions of the present invention can be prepared by any of the several polymerization methods known to those skilled in the art including, for example anionic, cationic or free radical, which is preferred, polymerization. The monovinyl aromatic polymers can be prepared by well-known methods including, for example, mass, emulsion, suspension and mass suspension methods. In general, continuous methods are employed for polymerizing the monovinyl aromatic monomer(s). Mass polymerization is the most preferred polymerization process for use in the present invention. Typically, mass polymerization results in a mixture of non-linear and linear polymers.

In this invention, the proportion of linear to non-linear polymers is not particularly critical as long as the melt strength specifications of the polymer are met. The proportion of linear to non-linear polymers depends on the type, amount and number of additions of initiator to the polymerization mixture as well as on the number and molecular weight of the branches of the non-linear polymer. If the non-linear polymer has a high number of high molecular weight branches (e.g. Mw of up to 50,000), then relatively lower amounts of the non-linear polymer are required to achieve the desired melt strength specification. If, on the other hand, the molecular weight of both the non-linear polymer and its branches are relatively low (e.g., both Mw of less than 50,000), a higher proportion of the non-linear polymer will be required. In the case where the molecular weight of both the non-linear polymer and its branches are relatively high, as low as 5 percent by weight will be sufficient to achieve the desired melt strength.

The non-linear monovinyl aromatic polymer compositions useful in the present invention advantageously have a weight average molecular weight (Mw) between 75,000 and 500,000, preferably between 100,000 and 400,000, more preferably between 120,000 and 380,000. The molecular weight distribution (Mw/Mn (number average molecular weight)) of the non-linear monovinyl aromatic polymer composition useful in the present invention is advantageously of from 1.1 to 5, preferably 1.5 to 4, and most preferably 1.8 to 4. The compositions useful in the present invention advantageously exhibit improved melt strength properties while essentially maintaining other important physical properties such as rigidity and toughness, and, in the case of clear matrix polymers, transparency and processability. Typically, the non-linear monovinyl aromatic polymer composition useful in the present invention exhibits melt strength properties in the range between 0.5 g at 1 90° C. to 10.0 g at 230° C., preferably from 1.5 g at 190° C. to 8.0 g at 230° C., and most preferably from 1.6 g at 190° C. to 6.0 g at 230° C.

The non-linear monovinyl aromatic polymer compositions useful in the present advantageously have a Vicat heat distortion temperature of at least 60° C., preferably between 70° C. and 110° C. It has been found that the non-linear monovinyl aromatic polymer compositions useful in the present invention, at a given melt and Vicat heat distortion temperature exhibits a melt strength of at least 20, preferably at least 30, more preferably at least 50 percent higher than linear monovinyl aromatic polymer compositions of same melt flow rate at a given Vicat heat distortion temperature.

In a preferred embodiment, the preparation of non-linear styrenic thermoplastic polymer resin compositions in accordance with the present invention is preferably carried out by feeding monovinyl aromatic monomer, advantageously in the presence of suitable amounts of an organic liquid reaction diluent, such as, for example, ethyl benzene, and in the presence of other optional additives, such as mineral oils, chain transfer agents and rubber, into a first, out of three, stirred tube-type reactor having 3 reaction zones. The 3 reactors are assembled in a series and each have 3 reaction zones with independent temperature control. The polymerization mixture is then initially heated up to at least 90° C. for at least one hour to initiate the polymerization and then to at least 140° C. for at least four hours. The copolymerizable organic peroxide initiator is then added to the polymerization mixture at any desired stage of the polymerization process. Typically, the initiator is added in the first reaction zone of any reactor, preferably of the first reactor. Typically, the polymerization is started at 100° C. and within the first reaction zone of the reactor, then the temperature is increased in order to maintain an approximately constant polymerization rate. Usually, the temperature in the third reaction zone of the third reactor reaches 180° C.

The polymerization mixture leaving the reactor is passed through a heater at a temperature in excess of 200° C. and then subjected to vacuum. At this point, unreacted monomers and diluents are evaporated and condensed in a condenser to be recycled to the feed in the first reaction zone. The polymer melt is then extruded and granulated.

The number, length, as well as molecular weight of the branches of non-linear polymers are readily determined by well-known kinetics calculations, based on the monomer composition, initiator reactivity, and/or process conditions. Such calculations are well known, for example from Principles of Polymerization, 2nd edition, John Wiley and sons, New York, 1981.

The aforementioned polymer compositions are particularly well suited for the preparation of closed-cell monovinyl aromatic polymer foamed articles of relatively low density. For purposes of the present invention, the term "low density" is meant to include foam densities of from 16 kg/m$^3$ (1 pound per cubic foot (pcf)) to 80 kg/m$^3$ (5 pcf). Especially preferred foam densities are from 24 kg/m$^3$ (1.5 pcf) to 64 kg/m$^3$ (4 pcf) having relatively small or fine cell size and having relatively large cross-sectional area(s) (for example, cross-sectional areas of at least about 50 cm$^2$ (8 square inches, (in$^2$)) and a minimum cross-sectional dimension of at least 0.6 cm (0.25 inches), preferably of 1.25 cm (0.5 inches).

As has been noted, a preferred feature of the present invention is the use as the blowing agent herein of a blowing system which consists essentially of a carbon dioxide blowing agent. Optionally, the blowing agent can be an admixture of carbon dioxide with other blowing agents, such as lower alcohols, that is, $C_1$–$C_6$ alcohols, preferably a $C_1$–$C_4$ alcohol. Representative lower alcohols include, for example, methanol, ethanol, isopropanol, propanol, butanol, pentanol, hexanol, and isomers thereof, with ethanol being especially preferred. Optionally, the blowing agent system may be comprised of a carbon dioxide blowing agent in an admixture with ethers, such as dimethylether, diethylether, methylethylether, methyl acetate, ethyl acetate, with dimethylether being especially preferred. Optionally, the blowing agent system may be comprised of a carbon dioxide blowing agent in an admixture with HCFC's or hydrofluorocarbons (HFC's), such as, for example 1-chloro-1,1-difluoroethane (HCFC-142b), difluoroethane (HFC-152a) or 1,1,1,2-tetrafluoroethane (HFC-134a).

In one embodiment of the present invention, the blowing agent system may be comprised of a carbon dioxide blowing agent in an admixture with $C_1$–$C_6$ hydrocarbons, such as, methane, ethane, propane, n-butane, isobutane, n-pentane, isopentane, cyclopentane and hexane, with n-butane, isobutane, n-pentane and isopentane being especially preferred. Yet in another embodiment of the present invention, the blowing agent system may be comprised of a carbon dioxide blowing agent in an admixture with ethanol and isopentane. It is surprising that these particular blowing agent systems work as well as they do in the manufacture of low density monovinyl aromatic polymer foams.

In the preparation of styrenic thermoplastic polymer foams in accordance with the present invention, it is most conveniently done in a manner generally as shown and described in U.S. Pat. No. 2,669,751, wherein the blowing agent is injected into a heat-plastified polymer stream within an extruder. From the extruder the heat-plastified gel is passed into a mixer, the mixer being a rotary mixer wherein a studded rotor is enclosed within a housing which has a studded internal surface which intermeshes with the studs on the rotor. The heat-plastified gel from the extruder is fed into the inlet end of the mixer and discharged from the outlet end, the flow being in a generally axial direction. From the mixer, the gel passes through coolers such as are described in U.S. Pat. No. 2,669,751 and from the coolers to a die which extrudes a generally rectangular board. A generally similar extrusion system and a preferred extrusion system is shown in U.S. Pat. No. 3,966,381.

Generally, the blowing agent mixture is pumped into the heat-plastified alkenyl aromatic resin and admixed therewith prior to expansion to form foam. The blowing agent may be admixed and pumped as a combination stream into the heat-plastified resin, or they may be supplied as separate streams. Adequate mixing of the blowing agents into the heat-plastified resin is required in order to obtain a product of desirable uniformity. Such mixing may be accomplished by a variety of means including rotary mixers such as extruders, so-called static mixers or interfacial surface generators, such as are utilized in U.S. Pat. Nos. 3,751,377 and 3,817,669.

In the preparation of foams in accordance with the present invention, it is often desirable to add a nucleating agent to reduce the cell size. Talc, magnesium oxide, calcium-silicate and calcium stearate, are suitable nucleating agents which reduce cell size. Various other additives may be utilized such as, for example, plasticizers or lubricants such as mineral oil, butyl stearate or dioctyl phthalate; fire retardant chemicals; stabilizers, including antioxidants (for example, alkylated phenols such as di-tert-butyl-p-cresol or phosphites such as trisnonyl phenyl phosphite); mold release agents, for example, zinc stearate; pigments and extrusion aids all of which are commonly used in foam preparation.

The foams prepared in the present invention can be used in numerous applications. Particularly, the foams of the present invention are suitable for use in the fields of construction, civil engineering and thermal insulation in general, as well as flotation (buoyancy) billets and for decorative purposes including floral/craft billets.

The following examples are given to illustrate the invention and should not be interpreted as limiting it in any way. Unless stated otherwise, all parts and percentages are given by weight.

The following test methods were employed to determine the physical properties of both the monovinyl aromatic polymer resin and the foam prepared therefrom.

Melt Flow Rate

The melt flow rate (MFR) is measured using a Zwick MFR Measurement Apparatus, Model 4105, according to the test procedure ASTM D-1238-86 at 200° C. and 5 kilograms (kg) load.

Melt Strength

Melt strength measurements are made using an extrusion plastometer as described in ASTM D-1238 at the temperatures given in the examples. A heated cylinder is filled with the polymer sample at a constant temperature with one end of the cylinder restricted with a small die (8 mm long) with an orifice having a diameter of 2.1 mm.

A constant load of 5 kg or a constant speed of the traverse (preferably of 10 mm/minutes) is applied to force the polymer through the orifice of the die after a predetermined heating time has elapsed. The extrudate passes vertically downward under a first pulley, then passes vertically upward over a second pulley and then passes horizontally to a wind-up drum. In the present invention, unless otherwise indicated, this wind-up drum is rotated at 100 revolutions per minute (rpm). Each pulley is of black anodized aluminum alloy, has a nominal diameter of 31.75 mm (1.25 inches) measured at the center of a 120° V-groove, and is 2.9 mm (0.114 inches) thick. Both pulleys have a precision instrument bearing and are statically balanced.

The strain on the first pulley is measured via a strain cell having a capacity of 60 grams or less. Typically, the most sensitive range of 0–10 grams is used for accuracy purposes. The strain cell is calibrated using analytical weights. The first pulley is mounted on a force lever which is adjustable to permit increasing the force applied to the strain cell by factors of up to 8 times the applied force. The wind-up drum is aluminum and has a diameter of 50.8 mm (2.0 inches) and is about 76.2 mm (3 inches) wide. The drum is equipped with a means for adjusting the speed over a range of from 0 to 2,000 rpm. The force at a given rate of rotation is a measure of the melt strength of the material.

Molecular Weight

The weight average molecular weight (Mw) and number average molecular weight (Mn) for the polymers are determined by the gel permeation chromatographic techniques described by ASTM test method D-3536 (polystyrene standard) and expressed without correction for the differences between polymers and polystyrene standards.

Density

The density of the foams is measured according to test method ASTM D-1622.

Cell Size

The cell size of the foams is measured according to test method ASTM D-3576.

Compressive Strength

The compressive strength of the foams is measured according to test method ASTM D-1621.

Thermal Dimensional Stability

The dimensional stability of the foams is measured according to test method DIN 18164, tests WD and W, and according to test method ASTM C-578.

EXAMPLES 1–2

Closed-cell styrene homopolymer foams were prepared from non-linear polystyrene (Resin I) according to the process of the present invention, utilizing a 2 inch (5.08 cm) diameter extruder which feeds a rotary mixer. The rotary mixer discharge was passed through heat exchangers. The discharge from the heat exchangers was, in turn, passed through a plurality of interfacial surface generators or static mixers. The discharge from the static mixers was passed to a slot die. Foam was discharged from the slot die at a rate of about 60 kg/h (130 pounds per hour). The monomeric compositions and respective properties of Resin I are set forth in Table I. The resin type and the respective blowing agent(s) proportions as well as the properties of each foam sample are set forth in Table II.

Comparative Examples A–B

Foam samples (Comparative Example A–B) were prepared following the procedure of Example 1, except that linear polystyrene (Resin II) was employed instead of non-linear polystyrene. The monomeric compositions and respective properties of Resin II are set forth in Table I. The resin type and the respective blowing agent(s) proportions as well as the properties of each foam sample are set forth in Table II.

EXAMPLES 3–4

Closed-cell styrene homopolymer foams were prepared with varying amounts and types of blowing agent(s) in accordance with the present invention using the same procedure and type of equipment as described in Example 1, except for using Resin III as the non-linear polystyrene and for using an 8 inch (20.3 cm) diameter extruder. The monomeric compositions and respective properties of Resin III are set forth in Table I. The resin type and the respective blowing agent(s) proportions as well as the properties of each foam sample are set forth in Table II.

Comparative Examples C–D

Foam samples (Comparative Example C–D) were prepared following the procedure of Example 3, except that linear polystyrene (Resin IV) was employed instead of non-linear polystyrene. The monomeric compositions and respective properties of Resin IV are set forth in Table I. The resin type and the respective blowing agent(s) proportions as well as the properties of each foam sample are set forth in Table II.

As readily apparent from Table II, the non-linear polystyrene (Examples 1, 2, 3 and 4) is easily processed in the foaming process, particularly at a much lower pressure. Specifically, although Resins III (Examples 3 and 4) and IV (Comparative Example C and D) have similar melt flow rates, Resin III is processable at a much lower pressure. The closed-cell foams of Examples 1–4 exhibit lower foam density than the foams of Comparative Examples A–D. Also, the foams of the present invention exhibit improved mechanical properties as well as the thermal dimensional stability over the foams made from linear polystyrene.

EXAMPLES 5–8

Closed-cell polystyrene copolymer foams were prepared with varying amounts and types of blowing agent(s) in accordance with the present invention using the same procedure and type of equipment as described in Example 1 and 3. Resin V was employed for Examples 5 and 6 and Resin VI was employed for Examples 7 and 8. The monomeric compositions and respective properties of each resin are set forth in Table I. The resin type and the respective blowing agent(s) proportions as well as the properties of each foam sample are set forth in Table III.

Comparative Examples E–F

Foam samples (Comparative Example E–F) were prepared following the procedure of Example 5, except that linear polystyrene (Resin VII) was employed instead of non-linear polystyrene. The monomeric compositions and respective properties of Resin VII are set forth in Table I. The resin type and the respective blowing agent(s) proportions as well as the properties of each foam sample are set forth in Table III.

As readily apparent from Table III, the non-linear polystyrene copolymer resins (Examples 5–8) were processed with a slightly lower pressure than the linear polystyrene copolymer resins (Comparative Examples E and F). Further, the foams of the present invention exhibited low density, larger cell size, improved mechanical properties and dimensional stability.

EXAMPLES 9–13

Closed-cell styrene copolymer foams were prepared in accordance with the present invention using the same procedure and type of equipment as described in Example 1, except for using Resin VIII as the non-linear polystyrene and for using an 1½ inch (3.1 cm) screw-type extruder with a slit die. The blowing agents were composed of carbon dioxide and a low ozone depleting gas, such as HCFC 142b or HFC 152a. The monomeric compositions and respective properties of Resin are set forth in Table I. The resin type and the respective blowing agent(s) proportions are set forth in Table IV.

Comparative Examples G–K

Foam samples (Comparative Examples G–K) were prepared following the procedure of Example 9, except that linear polystyrene (Resin IX) was employed instead of non-linear polystyrene. The monomeric compositions and respective properties of Resin IX are set forth in Table I. The resin type and the respective blowing agent(s) proportions as well as the properties of each foam sample are set forth in Table IV.

As readily apparent from the data shown in Table IV, with the use of non-linear polystyrene resins, according to the present invention, the foaming temperature can be increased as a result of the higher melt strengths characteristics of these non-linear polymers. Consequently, the blowing agent efficiency is improved significantly allowing for production of low density foams.

TABLE I

Resin Properties

| Resin Type | Polymer composition | | | Mw | Mw/Mn | Melt Flow Rate, g/10 min | Melt Tension[4], g |
| | LPS[1] | NPS[2] | BA[3] | | | | |
| --- | --- | --- | --- | --- | --- | --- | --- |
| Resin I | — | 100 | — | 147,000 | 2.26 | 24.0 | 2.2 (200) |
| Resin II* | 100 | — | — | 195,000 | 2.50 | 10.2 | 5.2 (200) |
| Resin III | — | 100 | — | 152,000 | 2.78 | 22.7 | 3.4 (190) |
| Resin IV* | 100 | — | — | 135,000 | 2.14 | 24.0 | 2.2 (190) |
| Resin V | — | 97 | 3 | 168,000 | 2.76 | 27.0 | 3.2 (200) |
| Resin VI | — | 96,1 | 3,9 | 160,000 | 2.31 | 27.0 | 2.1 (200) |
| Resin VII* | 97 | — | 3 | 157,000 | 2.36 | 24.0 | 2.0 (190) |
| Resin VIII | — | 100 | — | 200,000 | 2.45 | 8.0 | 9.4 (190) |
| Resin IX* | 100 | — | — | 195,000 | 2.30 | 7.0 | 6.2 (190) |

*Not an example of the present invention.
[1]LPS is a linear polystyrene resin in pph.
[2]NPS is a non-linear polystyrene resin in pph.
[3]BA is butyl acrylate in weight percent.
[4]Melt tension measured at temperature in degrees centigrade indicated in parenthesis.

TABLE II

| Ex. or Comp. Ex. | Ex. 1 | Comp. Ex. A* | Ex. 2 | Comp. Ex. B* |
| --- | --- | --- | --- | --- |
| Resin Type | I | II* | I | II* |
| HBCD (a), pph | 2.5 | 0 | 2.5 | 0 |
| Additives (c), pph | 0.5 | 0.5 | 0.5 | 0.5 |
| $CO_2$, pph (b) | 5.0 | 4.4 | 4.0 | 4.0 |
| Ethanol, pph | 0 | 0 | 2.0 | 2.0 |

TABLE II-continued

| | | | | |
|---|---|---|---|---|
| Pentane, pph | 0 | 0 | 0 | 0 |
| Foaming Temp., °C. | 128 | 128 | 130 | 128 |
| Pressure Drop, bar | 96 | 189 | 36 | 130 |
| Board Thickness, mm | 25 | 25 | 25 | 25 |
| Density, Kg/m$^3$ | 44.3 | 48.7 | 35.6 | 41.8 |
| Cell Size vertical, mm | 0.32 | 0.43 | 0.41 | 0.24 |
| Vertical Compressive Strength, kpa | 377 | 455 | 394 | — |
| Extrusion Compressive Strength, KPa | 225 | 369 | 140 | — |
| Horizontal Compressive Strength kPa | 215 | 318 | 188 | — |
| Dimensional Stability | | | | |
| DIN 18164 - WD, % | 1.1 | 1.0 | 1.6 | — |
| DIN 18164 - W Thickness, % | 0.0 | 0.0 | 0.3 | — |
| DIN 18164 - W Length, % | 0.0 | −0.2 | 0.8 | — |
| DIN 18164 - W Width, % | −0.1 | −0.4 | −0.2 | — |
| ASTM C-578 - thickness, % | 0.1 | −0.2 | 1.0 | — |
| ASTM C-578 - length, % | 0.1 | −0.1 | 1.5 | — |
| ASTM C-578 - width, % | −0.2 | −0.1 | −0.2 | — |

| Ex. or Comp. Ex. | Ex. 3 | Comp. Ex. C* | Ex. 4 | Comp. Ex. D* |
|---|---|---|---|---|
| Resin Type | III | IV* | III | IV* |
| HBCD (a), pph | 2.5 | 2.5 | 2.5 | 2.5 |
| Additives (c), pph | 0.5 | 0.5 | 0.5 | 0.5 |
| CO$_2$, pph (b) | 4.0 | 4.0 | 4.0 | 4.0 |
| Ethanol, pph | 1.5 | 1.5 | 0 | 0 |
| Pentane, pph | 0 | 0 | 1.6 | 2.0 |
| Foaming Temp., °C. | 128 | 117 | 117 | 109 |
| Pressure Drop, bar | 67 | 76 | 62 | 72 |
| Board Thickness, mm | 50 | 50 | 70 | 90 |
| Density, Kg/m$^3$ | 36.2 | 38.8 | 34.8 | 39.4 |
| Cell Size vertical, mm | 0.35 | 0.41 | 0.29 | 0.31 |
| Vertical Compressive Strength, kPa | 338 | 347 | 348 | 621 |
| Extrusion Compressive Strength, kpa | 253 | 279 | 192 | 169 |
| Horizontal Compressive Strength kPa | 161 | 199 | 152 | 152 |
| Dimensional Stability | | | | |
| DIN 18164 - WD, % | 2.0 | 2.6 | 2.1 | 2.5 |
| DIN 18164 - W Thickness, % | 0.0 | −0.1 | 0.3 | 0.1 |
| DIN 18164 - W Length, % | −1.1 | −1.3 | −1.6 | −3.4 |
| DIN 18164 - W Width, % | −1.5 | −1.4 | −1.3 | −0.9 |
| ASTM C-578 - thickness, % | 0.1 | −0.1 | 0.4 | −0.1 |
| ASTM C-578 - length, % | −0.9 | −1.1 | −0.7 | −1.4 |
| ASTM C-578 - width, % | −1.1 | −1.1 | −0.4 | −0.5 |

TABLE III

| Ex. or Comp. Ex. | Ex. 5 | Ex. 6 | Comp. Ex. E* |
|---|---|---|---|
| Resin type | V | V | VII* |
| HBCD (a), pph (b) | 2.5 | 2.5 | 2.5 |
| Additives (c), pph | 0.5 | 0.5 | 0.5 |
| CO$_2$, pph | 4.6 | 4.7 | 4.7 |
| Ethanol, pph | 1.0 | 0 | 1.0 |
| Pentane, pph | 0 | 2.0 | 0 |
| Foaming Temp., °C. | 112 | 117 | 117 |
| Pressure Drop, bar | 69 | 50 | 79 |
| Board Thickness, mm | 50 | 50 | 50 |

TABLE III-continued

| | | | |
|---|---|---|---|
| Density, kg/m$^3$ | 35.9 | 33.7 | 34.6 |
| Cell size vertical, mm | 0.43 | 0.23 | 0.35 |
| Vertical Compressive Strength, kPa | 272 | 321 | 249 |
| Extrusion Compressive Strength, kPa | 279 | 237 | 261 |
| Horizontal Compressive Strength, kPa | 148 | 149 | 133 |
| Dimensional Stability | | | |
| DIN 18164 - WD (d), % | 5.4 | 6.6 | 4.7 |
| DIN 18164 - W thickness, % | 0 | 0.6 | 0 |
| DIN 18164 - W length, % | −1.8 | −1.7 | −1.0 |
| DIN 18164 - W width, % | −2.8 | −2.2 | −2.9 |
| ASTM C-578 - thickness, % | 0.1 | 0.5 | 0 |
| ASTM C-578 - length, % | −1.3 | −0.7 | −0.9 |
| ASTM C-578 - width, % | −1.6 | −0.6 | −1.6 |

| Ex. or Comp. Ex. | Comp. Ex. F* | Ex. 7 | Ex. 8 |
|---|---|---|---|
| Resin type | VII* | VI | VI |
| HBCD (a), pph (b) | 2.5 | 2.5 | 2.5 |
| Additives (c), pph | 0.5 | 0.5 | 0.5 |
| CO$_2$, pph | 4.9 | 5.0 | 5.0 |
| Ethanol, pph | 0 | 0 | 2.0 |
| Pentane, pph | 2.0 | 0 | 0 |
| Foaming Temp., °C. | 116 | 122 | 119 |
| Pressure Drop, bar | 47 | 78 | 34 |
| Board Thickness, mm | 50 | 25 | 25 |
| Density, kg/m$^3$ | 33.8 | 41.0 | 34.5 |
| Cell size vertical, mm | 0.19 | 0.28 | 0.34 |
| Vertical Compressive Strength, kPa | 393 | 424 | 481 |
| Extrusion Compressive Strength, kPa | 237 | 350 | 153 |
| Horizontal Compressive Strength, kPa | 142 | 201 | 169 |
| Dimensional Stability | | | |
| DIN 18164 - WD (d), % | 19.9 | 3.3 | 4.4 |
| DIN 18164 - W thickness, % | −0.3 | −0.4 | −0.1 |
| DIN 18164 - W length, % | −1.4 | −0.2 | 0.5 |
| DIN 18164 - W width, % | −1.8 | −0.2 | −0.1 |
| ASTM C-578 - thickness, % | −0.3 | −0.1 | −0.1 |
| ASTM C-578 - length, % | −0.9 | −0.1 | 1.4 |
| ASTM C-578 - width, % | −0.1 | −0.1 | −0.2 |

TABLE IV

| Ex. or Comp. Ex. | Ex. 9 | Comp. Ex. G* | Ex. 10 | Comp. Ex. H* | Ex. 11 | Comp. Ex. I* | Ex. 12 | Comp. Ex. J* | Ex. 13 | Comp. Ex. K* |
|---|---|---|---|---|---|---|---|---|---|---|
| Resin Type | VIII | IX* | VIII | IX* | VIII | IX* | VIII | IX* | VIII | XI* |
| Additives (c), pph | — | — | — | — | — | — | 1.7 | 1.7 | 1.7 | 1.7 |

TABLE IV-continued

| Ex. or Comp. Ex. | Ex. 9 | Comp. Ex. G* | Ex. 10 | Comp. Ex. H* | Ex. 11 | Comp. Ex. I* | Ex. 12 | Comp. Ex. J* | Ex. 13 | Comp. Ex. K* |
|---|---|---|---|---|---|---|---|---|---|---|
| $CO_2$, pph | 1.5 | 1.5 | 1.2 | 1.2 | 1.7 | 1.7 | — | — | — | — |
| HCFC-142b, pph (b) | 9.0 | 9.0 | 7.0 | 7.0 | 10.0 | 10.0 | — | — | 1.5 | 1.5 |
| EtCl (d), pph | — | — | 2.0 | 2.0 | 2.9 | 2.8 | — | — | — | — |
| HFC-152a, pph | — | — | — | — | — | — | 7.8 | 7.8 | 8.8 | 8.3 |
| Foaming Temp., °C. | 130 | 122 | 144 | 140 | 121 | 121 | 129 | 123 | 128 | 122 |
| Density, kg/m$^3$ | 35.9 | 44.5 | 32.3 | 35.0 | 31.7 | 33.3 | 33.0 | 35.7 | 30.6 | 33.1 |
| Cell size vertical, mm | 0.08 | 0.06 | 0.41 | 0.13 | 0.16 | 0.11 | — | — | — | — |

*Not an example of the present invention.
(b) pph = parts per hundred parts of polystyrene.
(c) additives composed of talc, polyethylene, magnesium oxide and hexabromocyclododecane.
(d) EtCl = ethyl chloride.

We claim:

1. A process for preparing a low density closed-cell polymer foams comprising the steps of heat-plastifying an expandable or foamable polymer formulation comprising a non-linear monovinyl aromatic polymer and an environmentally acceptable blowing agent, the non-linear monovinyl aromatic polymer comprising from 50 to 100 weight percent of the polymer in the formulation; and reducing the pressure on the mixture to form a foam having a plurality of closed plurality of closed cells having an average cell size of at least about 0.08 millimeter.

2. The process according to claim 1 wherein the non-linear monovinyl aromatic polymer composition comprises an at least three-point branched polystyrene.

3. The process according to claim 1 wherein the blowing agent is solely carbon dioxide.

4. The process according to claim 1 wherein the blowing agent is a mixture of carbon dioxide and lower alcohols.

5. The process according to claim 4 wherein the blowing agent is a mixture of carbon dioxide and ethanol.

6. The process according to claim 1 wherein the blowing agent is a mixture of carbon dioxide and $C_1$–$C_6$ hydrocarbons.

7. The process according to claim 6 wherein the blowing agent is a mixture of carbon dioxide and pentane.

8. The process according to claim 1 wherein the blowing agent is a mixture of carbon dioxide and a blowing agent of HCFC and HFC.

9. The process according to claim 8 wherein the blowing agent is a mixture of carbon dioxide and HCFC-142b.

10. The process according to claim 8 wherein the blowing agent is a mixture of carbon dioxide and HCFC-152a.

11. The process according to claim 1 wherein the blowing agent is dimethyl ether.

12. The process according to claim 1 wherein the blowing agent is a mixture of carbon dioxide and dimethyl ether.

13. The process according to claim 1 wherein the blowing agent is a mixture of carbon dioxide, a $C_1$–$C_6$ hydrocarbon and an HCFC or HFC.

14. The process according to claim 1 wherein the blowing agent is a mixture of carbon dioxide, a lower alcohol and an HCFC or HFC.

15. The process according to claim 1 wherein the blowing agent is a mixture of carbon dioxide, water and an HCFC or HFC.

* * * * *